(12) United States Patent
Koch et al.

(10) Patent No.: US 8,202,951 B2
(45) Date of Patent: *Jun. 19, 2012

(54) SLURRY PHASE POLYMERISATION PROCESS

(75) Inventors: Benoit Koch, Hennut (BE); Daniel Marissal, Carry le Rouet (FR); Marc Parisel, Vilvoorde (BE); Brent R Walworth, Sint-Niklaas (BE)

(73) Assignee: Ineos Manufacturing Belgium NV, Antwerpen (BE)

(*) Notice: Subject to any disclaimer, the term of this patent is extended or adjusted under 35 U.S.C. 154(b) by 161 days.

This patent is subject to a terminal disclaimer.

(21) Appl. No.: 12/733,381

(22) PCT Filed: Aug. 29, 2008

(86) PCT No.: PCT/EP2008/061370
§ 371 (c)(1),
(2), (4) Date: Feb. 25, 2010

(87) PCT Pub. No.: WO2009/030645
PCT Pub. Date: Mar. 12, 2009

(65) Prior Publication Data
US 2010/0190921 A1   Jul. 29, 2010

(30) Foreign Application Priority Data
Sep. 3, 2007  (EP) .................................. 07253474

(51) Int. Cl.
C08F 2/00 (2006.01)
C08F 4/00 (2006.01)
C08F 210/00 (2006.01)
C08F 110/02 (2006.01)
B01J 10/00 (2006.01)
B01J 19/18 (2006.01)

(52) U.S. Cl. ............ 526/64; 526/65; 526/348; 526/352; 526/90; 422/132; 422/129

(58) Field of Classification Search .................. 526/64, 526/65, 348, 352, 90; 422/129, 132
See application file for complete search history.

(56) References Cited

U.S. PATENT DOCUMENTS

| | | | |
|---|---|---|---|
| 4,424,341 A | 1/1984 | Hanson et al. | |
| 5,639,834 A | 6/1997 | Debras et al. | |
| 6,204,344 B1 | 3/2001 | Kendrick et al. | |
| 6,225,421 B1 | 5/2001 | Promed et al. | |
| 6,716,936 B1 | 4/2004 | McGrath et al. | |
| 2003/0191251 A1 | 10/2003 | McGrath | |
| 2004/0198911 A1 | 10/2004 | Van Dun et al. | |
| 2005/0272891 A1* | 12/2005 | Fouarge et al. ............... | 526/943 |

FOREIGN PATENT DOCUMENTS

| | | |
|---|---|---|
| EP | 0 057 420 A2 | 8/1982 |
| EP | 0 649 860 A1 | 4/1995 |
| EP | 1 333 044 A1 | 8/2003 |
| EP | 1 914 250 A1 | 4/2008 |
| WO | WO 92/12181 A1 | 7/1992 |
| WO | WO 96/19503 A1 | 6/1996 |
| WO | WO 99/47251 | 9/1999 |
| WO | WO 99/47251 A1 | 9/1999 |
| WO | WO 2005/044871 A1 | 5/2005 |
| WO | WO 2006/056756 A1 | 6/2006 |
| WO | WO 2006/056761 A1 | 6/2006 |
| WO | WO 2006/056763 A1 | 6/2006 |

OTHER PUBLICATIONS

Form PCT/IB/326, Notification Concerning Transmittal of International Preliminary Report on Patentability, mailed Mar. 18, 2010; PCT International Application No. PCT/EP2008/061370; International Filing Date Aug. 29, 2008 (6 pgs).
Form PCT/IB/326, Notification Concerning Transmittal of Copy of International Preliminary Report on Patentability, mailed Mar. 18, 2010; PCT International Application No. PCT/EP2008/061366; International Filing Date Aug. 29, 2008 (10 pgs).
Form PCT/IB/326, Notification Concerning Transmittal of Copy of International Preliminary Report on Patentability, mailed Mar. 18, 2010; PCT International Application No. PCT/EP2008/061372; International Filing Date Aug. 29, 2008 (10 pgs).
Form PCT/IB/326, Notification Concerning Transmittal of Copy of International Preliminary Report on Patentability, mailed Mar. 18, 2010; PCT International Application No. PCT/EP2008/061371; International Filing Date Aug. 29, 2008 (10 pgs).
Form PCT/IB/326, Notification Concerning Transmittal of Copy of International Preliminary Report on Patentability, mailed Mar. 18, 2010; PCT International Application No. PCT/EP2008/061369; International Filing Date Aug. 29, 2008 (7 pgs).
Specification of co-pending U.S. Appl. No. 12/733,358, filed Feb. 25, 2010, (22 pgs).
Specification of co-pending U.S. Appl. No. 12/733,379, filed Jul. 9, 2010, (23 pgs).
Specification of co-pending U.S. Appl. No. 12/733,380, filed Feb. 25, 2010, (21 pgs).
Specification of co-pending U.S. Appl. No. 12/733,378, filed Feb. 25, 2010, (28 pgs).

* cited by examiner

Primary Examiner — William Cheung
(74) Attorney, Agent, or Firm — Nixon & Vanderhye

(57) ABSTRACT

Process for producing a multimodal polyethylene in at least two reactors connected in series, in which 20-80 wt % of a first polymer is made in suspension in a first reactor and 80-20 wt % of a second polymer is made in suspension in a second reactor in the presence of the first polymer, and a stream or slurry containing the resulting polymer is withdrawn from the second reactor and transferred to a flash tank operating at a pressure and temperature such that at least 50 mol % of the liquid component of the slurry, or the non-polymer component of the stream entering the flash tank, is withdrawn from the flash tank as a vapour, wherein the concentration in the stream or slurry entering the flash tank of components having a molecular weight below 50 g/mol, $C_{lights}$ (mol %), satisfies the equation $C_{lights} < 7 + 0.07(40 - T_c) + 4.4(P_c - 0.8) - 7(C_{H2}/C_{Et})$ where $T_c$ and $P_c$ are respectively the temperature (in °C.) and pressure (MPa g) at the location where the vapour withdrawn from the flash tank is condensed, and $C_{H2}$ and $C_{Et}$ are the molar concentrations in the flash tank of hydrogen and ethylene respectively.

25 Claims, No Drawings

SLURRY PHASE POLYMERISATION PROCESS

This application is the U.S. national phase of International Application No. PCT/EP2008/061370 filed 29 Aug. 2008 which designated the U.S. and claims priority to European Application No. 07253474.6 filed 3 Sep. 2007, the entire contents of each of which are hereby incorporated by reference.

The present invention is concerned with olefin polymerisation in slurry phase reactors, and more specifically in multiple reactor systems.

Slurry phase polymerisation of olefins is well known wherein an olefin monomer and optionally olefin comonomer are polymerised in the presence of a catalyst in a diluent in which the solid polymer product is suspended and transported.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts.

Many multiple reactor systems employ loop reactors, which are of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of each loop reactor of a multiple reactor system can vary but is typically in the range 10-200 $m^3$, more typically 50-120 $m^3$. The loop reactors employed in the present invention are of this generic type.

Typically, in the slurry polymerisation process of polyethylene for example, the slurry in the reactor will comprise the particulate polymer, the hydrocarbon diluent(s), (co) monomer(s), catalyst, chain terminators such as hydrogen and other reactor additives In particular the slurry comprises 20-80 weight percent (based on the total weight of the slurry) of particulate polymer and 80-20 weight percent (based on the total weight of the slurry) of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

The slurry is pumped around the relatively smooth path endless loop reaction system at fluid velocities sufficient to maintain the polymer in suspension in the slurry and to maintain acceptable cross-sectional concentration and solids loading gradients. Slurry is withdrawn from the polymerisation reactor containing the polymer together with the reagents and inert hydrocarbons, all of which mainly comprise inert diluent and unreacted monomer. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer. The reagents and hydrocarbons need to be separated from the polymer and recovered for economic, safety and environmental reasons, and many processes for achieving this are known in the art. These processes generally involve depressurising and devolatilising the polymer-containing stream after it has been withdrawn from the polymerisation reactor. The diluent and unreacted monomer can then be recompressed back into liquid form and recycled back into the reactor, whilst the solid polymer can be transferred for further processing.

A well-known disadvantage of the above process for separating and recycling the liquid components withdrawn from the reactor with the polymer is that recompressing them back into liquid form after they have been vaporised in the separation process requires considerable energy. Thus for single reactor operations, alternatives have been proposed such as in WO 99/47251 where the majority of the liquid components withdrawn with the polymer are separated in a flash tank at a temperature and pressure such that they can be recondensed just by cooling, without recompression. The remaining liquid components not removed by this process are separated in a second flash tank operating at a lower pressure, and these need to be recompressed in order to be recycled. The advantage of this process, which is referred to hereinafter as a "medium pressure flash" process, is that only a small proportion of the vaporised liquid components need to be recompressed in order to be recondensed.

Whilst the above "medium pressure flash" process has been found to be suitable in single reactor polymerisations, it is nevertheless dependent for its success on the composition of the slurry withdrawn from the reactor system and depressurised. In some polymerisations hydrogen is added to the reaction, and if the content of unreacted monomer, hydrogen and other light components in the slurry withdrawn from the reactor is too high, it will not be possible to flash at a temperature and pressure which would allow both vaporisation of a substantial portion of those components and also recondensation thereof (using an economically viable coolant such as water) without compression. In such a case it would still be necessary to recompress and/or substantially cool the vaporised components in order to recycle them to the reactor.

In multiple reactor polymerisations, the composition of the slurry withdrawn from the final reactor depends on many factors apart from the composition of the product actually polymerised in the final reactor: it also depends on the desired final product, and the reaction conditions and relative proportions of products in any upstream reactors. The reaction conditions required in the final reactor are also affected by the reaction conditions in upstream reactors, particularly the impact of catalyst productivity in upstream reactors on the average activity potential under downstream reaction conditions. Thus the control of the slurry composition withdrawn from the final reactor and also the process conditions associated therewith is more complex than in the case of a single reactor. Consequently ensuring that a "medium pressure flash" process can operate without the need for recompression of the liquid vaporised in the first flash tank is equally more problematic. We have found that this is particularly the case in polymerisations where a multimodal polyethylene is made in at least two reactors in series, with a high molecular weight (HMW) polymer being made in a one reactor and a low molecular weight (LMW) polymer being made in another reactor. One example of such a process is described in WO 05/080457. However we have found that by careful control of the reaction conditions in such cases it is possible to ensure that a "medium pressure flash" process is able to be operated without the need for recompression of the liquid vaporised in the first flash tank.

Accordingly, in a first aspect the invention provides a process for producing a multimodal polyethylene in at least two reactors connected in series, in which 20-80 wt % of a first polymer is made in suspension in a first reactor and 80-20 wt % of a second polymer is made in suspension in a second reactor in the presence of the first polymer, and a stream containing the resulting polymer is withdrawn from the second reactor and transferred to a flash tank operating at a pressure and temperature such that at least 50 mol % of the non-polymer component of the stream entering the flash tank is withdrawn therefrom as a vapour, wherein the concentration in the stream entering the flash tank of components having a molecular weight below 50 g/mol, $C_{lights}$ (mol %), satisfies the equation $C_{lights} < 7 + 0.07(40 - T_c) + 4.4(P_c - 0.8) - 7(C_{H2}/C_{Et})$ where $T_c$ and $P_c$ are respectively the temperature (in °C.) and pressure (MPa g) at the location where the vapour withdrawn from the flash tank is condensed, and $C_{H2}$ and $C_{Et}$ are the molar concentrations in the flash tank of hydrogen and ethylene respectively.

Usually the polymer-containing stream exits the reactor as a slurry, of which the non-polymer component in in the liquid phase. By the time the stream enters the flash tank however, most if not all of the non-polymer component is in the vapour phase.

An alternative embodiment of the present invention provides a process for producing a multimodal polyethylene in at least two reactors connected in series, in which 20-80 wt % based on total polyethylene of a first polymer is made in suspension in a first reactor and 80-20 wt % based on total polyethylene of a second polymer is made in suspension in a second reactor in the presence of the first polymer, and a slurry containing the resulting polymer is withdrawn from the second reactor and transferred to a flash tank operating at a pressure and temperature such that at least 50 mol % of the liquid component of the slurry is withdrawn from the flash tank as a vapour, wherein the concentration in the slurry entering the flash tank of components having a molecular weight below 50, $C_{lights}$ (mol %), satisfies the equation $C_{lights} < 7 + 0.07(40 - T_c) + 4.4(P_c - 0.8) - 7(C_{H2}/C_{Et})$ where $T_c$ is the condensation temperature (° C.) of said vapour, $P_c$ is the pressure (MPa g) at the location where the vapour withdrawn from the flash tank is condensed, and $C_{H2}$ and $C_{Et}$ are the molar concentrations in the flash tank of hydrogen and ethylene respectively.

The calculation of the proportion of the liquid component of the slurry withdrawn from the flash tank as a vapour is based on the liquid component of the slurry at the reactor exit.

It is preferred that at least 80 mol %, more preferably 90 mol %, most preferably 95 mol % of the liquid component of the slurry is withdrawn from the flash tank as a vapour. Optimally at least 98 mol % of the liquid component of the slurry can be withdrawn from the flash tank as a vapour.

The above process has the potential to enable at least 98 mol %, preferably at least 98.5 mol %, and more preferably at least 99.5 mol %, of the vapour withdrawn from the flash tank to be condensed at a temperature of between 15° C. and 50° C., and in particular at a temperature of between 15° C. and 40° C., without compression, after which it can be recycled to a polymerisation reactor. The above temperature is the temperature at the location where the vapour withdrawn from the flash tank is condensed, $T_c$.

It is preferred that 30-70 wt % of the first polymer is made in the first reactor and 70-30 wt % of the second polymer is made in the second reactor.

Components of the slurry which have a molecular weight below 50 g/mol are typically all hydrocarbon components containing 3 carbon atoms or less, including ethylene, propylene, methane, ethane, propane and hydrogen.

The invention is particularly suited to multimodal reaction systems using the same catalyst in more than one reactor, preferably the same catalyst in all reactors. The addition of fresh additional or alternative catalyst in downstream reactors is however also within the scope of this invention. It is preferred that the ratio of mass of catalyst introduced into the first reactor to mass of catalyst introduced into all the reactors (R1c) is greater than the ratio of mass of polymer produced in the first reactor to mass of polymer produced in all the reactors (R1p); preferably R1c/R1p is between 1.3 and 2.5.

In one embodiment of the invention, the concentration of components having a molecular weight below 50 g/mol in the slurry entering the flash tank is controlled by a post-polymerisation treatment, in which the conditions between the second reactor and the flash tank are controlled to ensure that further polymerisation takes place before entering the flash tank, thereby consuming some of the components having a molecular weight below 50 g/mol. The object of the post-polymerisation stage is to reduce the concentration of components having a molecular weight below 50 g/mol in the slurry whilst minimizing the effect on the final product properties. The residence time, temperature and slurry velocity are controlled to achieve the reduction required in the concentration of these components whilst avoiding blockage or fouling in the post-polymerisation zone. In order to achieve the required degree of polymerisation, it is preferred that in this embodiment the residence time of the slurry in the post-polymerisation zone between the second reactor and the flash tank is at least 20 seconds, preferably at least 1 minute and more preferably between 2 and 10 minutes. Typically, residence times of 2-5 minutes are employed.

The post-polymerisation zone may be provided in the form of an agitated tank; however it is most preferred that it is in the form of an expanded diameter transfer line between the second reactor and the flash tank, which provide essentially plug flow rather than "continuous stirred tank-like" reaction conditions. The volume of the expanded diameter portion of the transfer line is typically between 1 m³ and 35 m³, preferably between 5 and 25 m³. Its preferred length to internal diameter ratio is between 100 and 1000, more preferably between 250 and 600. It is also preferred that the internal diameter is between 200 and 1000 mm, most preferably between 500 and 750 mm. The residence time preferably occurs upstream of a hydrocyclone, the slurry pressure let-down valve and the in-line slurry heater. The slurry velocity in the post polymerization zone is preferably between 1 m/s and 20 m/s.

In an alternative embodiment of the invention, the concentration of components having a molecular weight below 50 g/mol in the slurry entering the flash tank is controlled either by introducing additional liquid into the slurry as it passes through the transfer line between the second reactor and the flash tank, and/or by adjusting the solids concentration of the slurry as it passes through said transfer line. The additional liquid which may be introduced is usually inert diluent having a lower molar concentration of components having a molecular weight below 50 g/mol ($C_{lights}$) than that of the slurry withdrawn from the reactor, and preferably a $C_{lights}$ that is 25-50% of the $C_{lights}$ in the slurry itself. The $C_{lights}$ of the additional liquid is preferably less than 1 mol %, most preferably 0 mol %. The solids concentration of the slurry may be adjusted by passing the slurry through a hydrocyclone located in the transfer line: the solids-rich stream is passed to the flash tank and the solids-lean stream is recycled either upstream in the transfer line or back to the reactor.

The above embodiments of the invention involving post-reactor treatment of the slurry leaving the second reactor make it possible to increase the average activity in the second reactor by increasing the concentration therein of reactants such as ethylene, without compromising the ability to avoid recompression of the liquid vaporised in the first flash tank, particularly when making low molecular weight polymers in the second reactor where a significant amount of hydrogen is also present.

In an alternative and preferred embodiment, the concentration of components having a molecular weight below 50 g/mol in the slurry entering the flash tank is controlled by controlling that concentration in the second reactor. Accordingly it is preferred that the concentration in the second reactor of components having a molecular weight below 50 also satisfies the equation $C_{lights} < 7 + 0.07(40 - T_c) + 4.4(P_c - 0.8) - 7(C_{H2}/C_{Et})$ where $C_{lights}$, $C_{H2}$, and $C_{Et}$ in this case are the concentrations of components having a molecular weight below 50 g/mol, hydrogen and ethylene respectively in the second reactor and P and $T_c$ are as previously defined. More preferably the concentration of components having a molecular weight below 50 g/mol in the second reactor is the same as the concentration of components having a molecular weight below 50 g/mol entering the flash tank.

In all embodiments of the invention, and referring either to the flash tank and/or the second reactor as discussed above, it is generally preferred that the concentration of components having a molecular weight below 50 g/mol satisfies the equation $C_{lights} < 7 + 0.07(40 - T_c) + 4.4(P_c - 0.8) - 7(C_{H2}/C_{Et})$ where $C_{lights}$, $C_{H2}$, $C_{Et}$, $P_c$ and $T_c$ are as defined previously and refer either to the second reactor or the flash tank depending on the particular embodiment of the invention.

Preferably the multimodal polyethylene has a shear ratio of at least 15, generally between 15 and 50, and preferably between 21 and 35. By "shear ratio" is meant the ratio of the high load melt index HLMI of the polyethylene to the $MI_5$ of the polyethylene. The HLMI and $MI_5$ are measured according to ISO Standard 1133 at a temperature of 190° C. using loads of 21.6 kg and 5 kg respectively. $MI_2$ is similarly measured but using a load of 2.16 kg.

The HLMI of the multimodal polyethylene exiting the final reactor is preferably between 1 and 100 g/10 min, and more preferably between 1 and 40 g/10 min.

Although it may be made in more than two reactors, it is most preferred that the mulitmodal polyethylene is a bimodal polymer made in two reactors in series. However this does not exclude the possibility that up to 10 wt % of a third polymer may be made between the two reactors. It also does not exclude the possibility of polymerisation taking place prior to the first reactor, for example in a prepolymerisation reaction. The first polymer made in the first reactor may be a low molecular weight (LMW) polymer and the second polymer made in the second reactor may be a high molecular weight (HMW) polymer. In one embodiment, 30-70 wt % and more preferably 40-60 wt % of a low molecular weight (LMW) polymer is made in the first reactor, and 70-30 wt % and more preferably 60-40 wt % of a high molecular weight (HMW) polymer is made in the second reactor. The most preferred range of ratios of the HMW and LMW polymers is 45-55 wt % to 55-45 wt %. The terms "low molecular weight" (LMW) and "high molecular weight" (HMW) are intended to be relative terms, in that the LMW polymer has a lower molecular weight than the HMW polymer; there is no limit on the absolute molecular weights which may be made in each reactor.

In an alternative embodiment, the HMW polymer is made in suspension in the first reactor and the LMW polymer is made in suspension in the second reactor in the presence of the first polymer, the ratios of each polymer preferably being 30-70 wt % and 70-30 wt % respectively. The following requirements apply to this embodiment only.

In this embodiment of the invention ("HMW-LMW"), it is preferably ensured that the concentration of components having a molecular weight below 50 in the second reactor satisfies the equation $C_{lights} < 7 + 0.07(40 - T_c) + 4.4(P_c - 0.8) - 7(C_{H2}/C_{Et})$ by ensuring the ratio of the average activity in the second LMW reactor to the average activity in the first HMW reactor is from 0.25 and 1.5. Average activity is typically higher in the first reactor (where a copolymer is usually made to obtain the HMW product) than in the second reactor (where a homopolymer or high density polymer is usually made to obtain the LMW product), and we have found that as a consequence the ratio of average activities between the reactors has to be controlled within these ranges in order to control the concentration of light components in the second reactor.

The average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)]. If no additional catalyst is added to the second reactor, when calculating the ratio of average activities the feed rate of catalyst into the two reactors is considered to be the same. If additional catalyst is added to the second reactor, the flow rate into the second reactor is considered to be the sum of the flowrate of catalyst from the first reactor plus the flowrate of additional fresh catalyst added directly into the second reactor. Alternatively, activity in each reactor may be calculated based on catalyst residues in the polymer produced in each reactor, as is well known, and the activity ratio calculated from this.

The residence time is defined as the mass of the polymer in the reactor (kg)/the output rate of polymer from the reactor (kg/hr). In a case where polymer is recycled back into the reactor, for example when a hydrocyclone is employed downstream of the reactor, the output rate of polymer is the net output rate (ie polymer withdrawn less polymer recycled).

This preferred embodiment of the present invention is particularly applicable when the polymerisation catalyst is a Ziegler-Natta catalyst, especially if the overall productivity of the process is at least 10 kg polyethylene/g catalyst, preferably greater than 15 kg polyethylene/g catalyst, most preferably greater than 20 kg polyethylene/g catalyst. If the polymerisation catalyst is a bis-Cp metallocene catalyst, most preferably a bis-tetrahydroindenyl (THI) compound, the overall productivity of the process in this case is preferably at least 3 kg polyethylene/g catalyst, preferably greater than 6 kg polyethylene/g catalyst, most preferably greater than 15 kg polyethylene/g catalyst. If the polymerisation catalyst is a mono-Cp metallocene catalyst, most preferably (t-butylamido) (tetramethyl-$\eta^5$-cyclopentadienyl)dimethyl silanetitanium-$\eta^4$-1.3-pentadiene, the overall productivity of the process in this case is preferably at least 3 kg polyethylene/g catalyst, preferably greater than 6 kg polyethylene/g catalyst, most preferably greater than 15 kg polyethylene/g catalyst.

In order to achieve the above ratio of average activities, it is preferred that the ratio of ethylene concentration (in mol %) in the second reactor to that in the first reactor is 5 or less. Preferably the ratio of ethylene concentration in the second reactor to that in the first reactor is 3 or less, and more preferably 2.5 or less. Most preferably both ethylene concentration ratio and average activity ratio requirements are satisfied together.

In this HMW-LMW embodiment it is preferred that the actual concentration of ethylene in the second reactor is less than 8 mol %. However in order to ensure a satisfactory level of productivity, it is also preferred that the ethylene concentration is greater than 1.5 mol %, preferably greater than 2 mol %. The concentration of hydrogen in the second reactor is preferably less than 5 mol %, more preferably less than 3 mol %. The ratio of hydrogen to ethylene is preferably 0-0.5 mol/mol.

Usually each of the reactors has an internal volume greater than 10 m³, more commonly greater than 25 m³ and in particular greater than 50 m³. Typical ranges are 75-200 m³ and more particularly 100-175 m³. In one version of the HMW-LMW embodiment of the invention the volumes of each of the reactors employed differ by less than 10%, and it is preferred that all of the volume, length and diameter of the reactors employed each independently differ by less than 10%. Most preferably in this version of the embodiment, the reactors have the same dimensions. For example, where a reactor system is designed to operate different catalyst types (eg Ziegler-Natta, chromium and/or metallocene) or a catalyst system where the average activity or production ratio required varies significantly between reactors under different operating regimes, it is preferred to employ reactors of equal volume reactors in order to accommodate the entire product range.

Thus in the HMW-LMW embodiment of the invention, in the case where the reactors differ in volume by no more than 10 vol %, it is preferred to balance the activities between the reactors and the respective cooling capacities by maintaining the temperature of the first reactor between 60 and 85° C., preferably between 60 and 80° C., and in some cases no higher than 75° C. It is also preferred that the ratio of solids concentration in the first reactor to that in the second reactor is maintained at less than 1.0, preferably between 0.6 and 0.8, as this also assists in maintaining the balance of average activity between the two reactors within the desired range.

Generally in the HMW-LMW embodiment of the invention, the solids concentration in the final LMW reactor is at least 35 wt %, most preferably between 45 wt % and 60 wt % and the solids concentration in the HMW reactor is between 20 wt % and 50 wt %, more preferably between 25 wt % and 35 wt %. The solids concentration is the average weight of polymer relative to the total weight of the slurry. In this case it is preferred to concentrate the solids transferred from the first reactor to the second reactor using a settling zone and/or hydrocyclone. A comonomer-free diluent stream may be introduced upstream of the hydrocyclone to reduce the proportion of comonomer transferred to the downstream reactor, thus increasing the density of the polymer produced in the LMW reactor.

By maintaining the preferred ratio of average activity and ethylene concentration ratio between the two reactors in the HMW-LMW embodiment, it is possible to achieve high overall space time yields (defined as production of polymer in kg/h per unit volume of reactor) and activities whilst still observing the $C_{lights}$ requirements of the invention in the flash tank. The average space time yield in all reactors combined may be maintained at greater than 100 kg/m³/h, more preferably greater than 150 kg/m³/h, and most preferably greater than 200 kg/m³/h.

However, where a plant has been designed to operate a single catalyst or product type, the volume and dimensions of each reactor may be optimised individually for the principal grades to be produced, and thus the two reactors may be of different volumes and dimensions. These different dimensions can be utilised in order to obtain the desired balance of average activity between the two reactors in accordance with the invention, thus providing greater freedom to vary other reaction parameters. Thus in order to achieve the desired ratio of average activity between the first (HMW) and second (LMW) reactors, in an alternative embodiment of the HMW-LMW aspect of the invention, the first (HMW) reactor may have a space time yield (defined as production of polymer in kg/h per unit volume of reactor) greater than 150 kg/m³/h, more preferably greater than 200 kg/m³/h, and most preferably greater than 250 kg/m³/h. In this case the ratio of space time yield in the first (HMW) reactor to the second (LMW) reactor may be greater than 1.2, for example greater than 1.5. This may be achieved by designing the first (HMW) reactor with a volume that is no more than 90%, preferably between 30-70%, and more preferably approximately 40-60%, of the volume of the second (LMW) reactor. In this case it is preferred that the ratio of length to diameter (L/D) of the first reactor is greater than 500, preferably between 750 and 3000, and most preferably greater than 800; additionally or alternatively, the ratio of L/D of the first reactor to L/D of the second reactor is greater than 1.5, most preferably greater than 2. In this reactor configuration, the average space time yield in all reactors combined may be maintained at greater than 150 kg/m³/h, more preferably greater than 200 kg/m³/h, and most preferably greater than 300 kg/m³/h.

Alternatively, the LMW polymer is made in the first reactor and the HMW polymer in the second reactor. The following requirements apply to this embodiment only.

In this embodiment of the invention ("LMW-HMW"), it is preferably ensured that the concentration of components having a molecular weight below 50 in the second reactor satisfies the equation $C_{lights} < 7 + 0.07(40 - T_c) + 4.4(P_c - 0.8) - 7(C_{H2}/C_{Et})$ by ensuring the ratio of average activity in the second HMW reactor to average activity in the first LMW reactor is from 1.5 to 0.25. The average activity in each reactor is defined as the amount of polyethylene produced in the reactor (kgPE)/[ethylene concentration in the reactor (mol %)×residence time in the reactor (hours)×weight of catalyst in the reactor (g)]. If no additional catalyst is added to the second reactor, when calculating the ratio of average activities the weight of catalyst in the two reactors is considered to be the same. The residence time is defined as the mass of the polymer in the reactor (kg)/the production rate of polymer (kg/hr).

This embodiment of the present invention is particularly applicable when the polymerisation catalyst is a Ziegler-Natta catalyst, especially if the overall productivity of the process is at least 10 kg polyethylene/g catalyst, preferably greater than 15 kg polyethylene/g catalyst, most preferably greater than 20 kg polyethylene/g catalyst. If the polymerisation catalyst is a bis-Cp metallocene catalyst, most preferably a bis-tetrahydroindenyl (THI) compound, the ratio of average activity in the second HMW reactor to average activity in the first LMW reactor is preferably between 1.5 and 0.25, and the overall productivity of the process in this case is preferably at least 3 kg polyethylene/g catalyst, preferably greater than 6 kg polyethylene/g catalyst, most preferably greater than 15 kg polyethylene/g catalyst. If the polymerisation catalyst is a mono-Cp metallocene catalyst, most preferably (t-butylamido) (tetramethyl-$\eta^5$-cyclopentadienyl)dimethyl silanetitanium-$\eta^4$-1.3-pentadiene, the ratio of average activity in the second HMW reactor to average activity in the first LMW reactor is preferably between 1.5 and 0.25, and the overall productivity of the process in this case is preferably at least 3 kg polyethylene/g catalyst, preferably greater than 6 kg polyethylene/g catalyst, most preferably greater than 15 kg polyethylene/g catalyst.

In order to achieve the above ratio of average activity, it is preferred that the ratio of ethylene concentration (in mol %) in the second reactor to that in the first reactor is 5 or less. Most preferably both ethylene concentration ratio and ratio of average activity requirements are satisfied together. Preferably the ratio of ethylene concentration in the second reactor to that in the first reactor is 3 or less, and more preferably 2 or less.

In this LMW-HMW embodiment it is preferred that the actual concentration of ethylene in the second reactor is less than 8 mol %. However in order to ensure a satisfactory level of productivity, it is also preferred that it is greater than 2 mol %. The ethylene concentration is preferably between 2 and 5 mol %. The concentration of hydrogen in the second reactor is preferably less than 5 mol %, more preferably less than 3 mol %.

Usually each of the reactors has an internal volume greater than 10 m$^3$, more commonly greater than 25m$^3$ and in particular greater than 50 m$^3$. Typical ranges are 75-200 m$^3$ and more particularly 100-175 m$^3$. In one version of the LMW-HMW embodiment of the invention the volume of the reactors employed each independently differ by less than 10%, and it is preferred that all of the volume, length and diameter of the reactors employed each independently differ by less than 10%. Most preferably in this version of the embodiment, the reactors have the same dimensions. For example, where a reactor system is designed to operate different catalyst types (eg Ziegler-Natta, chromium and/or metallocene) or a catalyst system where the average activity or production ratio required varies significantly between reactors under different operating regimes, reactors of equal volume reactors are typically used in order to accommodate the entire grade range. The existence of such externally imposed reactor dimensions places constraints on the operating window available for each reactor, and thus on the ability to balance reactor average activity, product quality, throughput and cooling in each reactor whilst at the same time maintaining the concentration of light components $C_{lights}$ below the level required by the invention.

Thus in the LMW-HMW embodiment of the invention, in the case where the reactors differ in volume by no more than 10 vol %, it is preferred to balance the activities between the reactors and the respective cooling capacities by maintaining the temperature of the first reactor between 70 and 110° C., preferably between 80 and 100° C. It is also preferred that the ratio of solids concentration in the first reactor to that in the second reactor is maintained at between 0.8 and 1.2, preferably between 0.9 and 1.0, as this also assists in maintaining the balance of average activity between the two reactors within the desired range.

Generally in the LMW-HMW embodiment of the invention, the solids concentration in each reactor is at least 35 wt %, most preferably between 45 wt % and 55 wt %. The solids concentration is the weight of polymer relative to the total weight of the slurry. In this case it is preferred to concentrate the solids transferred from the first reactor to the second reactor using a settling zone and/or hydrocyclone. A hydrogen-free diluent stream may be introduced upstream of the hydrocyclone to reduce the proportion of hydrogen transferred to the downstream reactor. It is most preferred to flash or fractionate the diluent transferred to the second (HMW) reactor hydrocyclone in order to minimize the hydrogen transferred to the downstream reactor.

However, where a plant has been designed to operate a single catalyst or product type, the volume and dimensions of each reactor may be optimised individually for the principal grades to be produced, and thus the two reactors may be of different volumes and dimensions. These different dimensions can be utilised in order to obtain the desired balance of average activity between the two reactors in accordance with the invention, thus providing greater freedom to vary other reaction parameters. Thus in order to achieve the desired ratio of average activity between the first (LMW) and second (HMW) reactors, in an alternative embodiment of the LMW-HMW aspect of the invention, the first (LMW) reactor may have a space time yield (defined as production of polymer in kg/h per unit volume of reactor) greater than 150 kg/m$^3$/h, more preferably greater than 200 kg/m$^3$/h, and most preferably greater than 250 kg/m$^3$/h. It is also preferred in this case that the ratio of space time yield in the first (LMW) reactor to the second (HMW) reactor is greater than 1.2, most preferably greater than 1.5. This may be achieved by designing the first (LMW) reactor with a volume that is no more than 90%, preferably between 30-70%, and more preferably approximately 40-60%, of the volume of the second (HMW) reactor. In this case it is preferred that the ratio of length to diameter (LID) of the first reactor is greater than 400, preferably between 400 and 800; additionally or alternatively, the ratio of L/D of the first reactor to L/D of the second reactor is greater than 1.5, most preferably greater than 2.

For both of the above embodiments of the invention (HMW-LMW and LMW-HMW), additives to enhance average activity may be added, preferably to the LMW reactor. Equally by-product suppressors may be added, preferably to the LMW reactor. Additionally or alternatively, further catalyst may also be added to the second reactor in order to control the average activity balance. When operating HMW-LMW configuration it is preferred to avoid the use of an activity enhancer in the HMW reactor and in LMW-HMW configuration it can generally be avoided, however can be used to minimise the concentration of monomers required in the HMW reactor. This reduces the downstream degassing energy requirements.

In all embodiments of the invention, one benefit of the invention is that the optimisation of reactor average activity balance, space time yields and cooling requirements, whilst at the same time minimising the $C_{lights}$ concentration in the flash tank so as to avoid the need to recompress, leads to improved efficiency. This invention can enable monomer efficiencies of less than 1.015, generally less than 1.01 and preferably less then 1.006 to be achieved even when employing a space time yield of at least 100 kg/m$^3$/h, more preferably at least 150 kg/m$^3$/h, most preferably at least 200 kg/m$^3$/h in each reactor. By "monomer efficiency" is meant the weight ratio of ethylene+comonomer consumed to polymer produced.

In the case where the catalyst used for the polymerisation reaction is a Ziegler-Natta catalyst, in both LMW-HMW and HMW-LMW embodiments it is preferred that a single activity enhancer and by-product suppressor is used in the LMW reactor. An example is a halogenated hydrocarbon, and more particularly a chloromethane of the formula $CH_xCl_{4-x}$ where x is an integer from 1 to 3. The most preferred chloromethane is chloroform, $CHCl_3$. The amount of halogenated hydrocarbon added is based on the amount of Ziegler-Natta catalyst, and is preferably such that the molar ratio of the halogenated hydrocarbon added to the reactor to titanium added to the reactor is greater than 0.1, preferably between 0.2 and 1. The use of a halogenated hydrocarbon is particularly desirable when used in conjunction with catalyst systems where it both enhances activity and suppresses the ethane formation, such as Ziegler-Natta catalysts. It is also useful in a reactor producing low molecular weight polymer since it has the combined effect of enhancing activity and suppressing ethane formation. Ethane formation adds to the concentration of light reagents in the reactor, thereby making it more difficult to maintain the concentration of $C_{lights}$ in the feed to the flash tank below the level required by the invention. Ethane formation can be particularly significant when making low molecular weight polymers, particularly if hydrogen is present. When making low molecular weight polymer in the second reactor it is also particularly desirable to boost the activity of the catalyst since the age of the catalyst and the high hydrogen concentration both contribute to a reduction in polymerisation activity. Halogenated hydrocarbons such as chloroform can therefore provides a double benefit, by boosting activity boost also minimising the concentration of $C_{lights}$ in the second reactor.

It is preferred in all aspects of the invention that the reactors are "liquid full": in other words, there is substantially no gas- or vapour-containing headspace in the reactor.

A preferred type of reactor utilised for the polymerisations to which all aspects of the invention are applicable is a loop reactor, which is a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of one loop reactor in a multiple reactor system can vary but is typically in the range 10-200 m$^3$. It is preferred that the polymerisation reactors utilised in the present invention are loop reactors, and further that the loop reactors are liquid full.

Typical pressures employed in the loop reactor are between 0.1-10 MPa g, preferably between 3 to 5 MPa g.

The process according to the invention applies to the preparation of compositions containing ethylene homopolymers and copolymers. Ethylene copolymers typically comprise one or more alpha-olefins in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

In one embodiment of the invention, the polymer is a polyethylene resin having a density of greater than 940 kg/m$^3$ and an HLMI of from 1 to 100 g/10 min, and comprising from 35 to 60 wt % of a first polyethylene fraction of high molecular weight and from 40 to 65 wt % of a second polyethylene fraction of low molecular weight, the first polyethylene fraction comprising a linear low density polyethylene having a density of up to 935 kg/m$^3$ and an HLMI of less than 1 g/10 min, and the second polyethylene fraction comprising a high density polyethylene having a density of at least 960 kg/m$^3$, preferably at least 965 kg/m$^3$, and an MI$_2$ of greater than 100 g/10 min, and the polyethylene resin.

Typical diluents for the suspensions in each reactor include hydrocarbons having 2 to 12, preferably 3 to 8, carbon atoms per molecule, for example linear alkanes such as propane, n-butane, n-hexane and n-heptane, or branched alkanes such as isobutane, isopentane, isooctane and 2,2-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer fanned is insoluble therein. Isobutane is particularly preferred as the diluent.

The operating conditions can also be such that the monomers act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is preferably adjacent to the downstream end of a horizontal section of the loop. The operation of large diameter reactors with high solids concentrations in the slurry minimises the quantity of the principal diluent withdrawn from the polymerisation loop. Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided. Increasing the concentration of easily condensable components, for example through addition of fresh or recycle diluent, upstream of the hydrocyclone is a further means of enhancing the operating window of the final reactor and reducing the concentration of monomer depressurised to the medium pressure flash tank.

Where the final reactor of the multiple reactor system is a loop reactor, the withdrawn, and preferably concentrated, polymer slurry is depressurised, and optionally heated, prior to introduction into a primary flash vessel. The stream is preferably heated after depressurisation. As a consequence of the invention, the diluent and any monomer vapours recovered in the primary flash vessel can be condensed without recompression. They are typically then recycled to the polymerization process. Typically the pressure in the primary flash vessel is 0.5-2.5 MPa g, preferably 0.5-1.5 MPa g. The solids recovered from the primary flash vessel are usually passed to a secondary flash vessel to remove residual volatiles.

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionising agent as described, for example, in EP 500944A (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained with those comprising:

from 10 to 30% by weight of transition metal, preferably from 15 to 20% by weight, from 20 to 60% by weight of halogen, preferably from 30 to 50% by weight from 0.5 to 20% by weight of magnesium, usually from 1 to 10% by weight, from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine. Most preferred catalysts have the following composition:

Transition metal from 8 to 20% by weight
Magnesium content from 3 to 15% by weight
Chlorine content from 40 to 70% by weight
Aluminum content less than 5% by weight
Residual organic content less than 40% by weight Polymerisations, particularly Ziegler catalysed ones, are typically carried out in the presence of a cocatalyst. It is possible to use any cocatalyst known in the art, especially compounds comprising at least one aluminum-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminum mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a volume porosity of greater than 2 cc/g preferably from 2 to 3 cc/g. Chromium-based catalysts may be used in conjunction with activators such organometallic compounds of aluminum or of boron. Preferred are organoboron compounds such as trialkylborons in which the alkyl chains comprise up to 20 carbon atoms. Triethylboron is particularly preferred.

If the catalyst employed is a metallocene catalyst, it preferably comprises a bis-tetrahydroindenyl (THI) compound. Preferably the catalyst system comprises (a) a metallocene catalyst component comprising a bis-tetrahydroindenyl compound of the general formula $(IndH_4)_2R''MQ_2$ in which each $IndH_4$ is the same or different and is tetrahydroindenyl or substituted tetrahydroindenyl, R" is a bridge which comprises a $C_1$-$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen; and (b) a cocatalyst which activates the catalyst component. Each bis-tetrahydroindenyl compound may be substituted in the same way or differently from one another at one or more positions in the cyclopentadienyl ring, the cyclohexenyl ring and the ethylene bridge. Each substituent group may be independently chosen from those of formula $XR_v$ in which X is chosen from group IVB, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M.

Substituents on the cyclopentadienyl ring preferably have R as hydrogen or $CH_3$. More preferably, at least one and most preferably both cyclopentadienyl rings are unsubstituted. In a particularly preferred embodiment, both indenyls are unsubstituted. R" is preferably an ethylene bridge which is substituted or unsubstituted. The metal M is preferably zirconium, hafnium or titanium, most preferably zirconium. Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl)zirconium dichloride is a particularly preferred bis tetrahydroindenyl compound.

Silica supported chromium catalysts are typically subjected to an initial activation step in air at an elevated activation temperature. The activation temperature preferably ranges from 500 to 850° C., more preferably 600 to 750° C.

In the process of the invention, the first reactor of the series is supplied with catalyst and the cocatalyst in addition to the diluent and monomer, and each subsequent reactor is supplied with, at least, monomer, in particular ethylene and with the slurry arising from a preceding reactor of the series, this mixture comprising the catalyst, the cocatalyst and a mixture of the polymers produced in a preceding reactor of the series. It is optionally possible to supply a second reactor and/or, if appropriate, at least one of the following reactors with fresh catalyst and/or cocatalyst. However, it is preferable to introduce the catalyst and the cocatalyst exclusively into a first reactor.

EXAMPLES

The following Examples describe the manufacture of a composition comprising ethylene polymers carried out in suspension in isobutane in two loop reactors of equal volume connected in series. 54 wt % of a high molecular weight ethylene/1-hexene copolymer was made in the first reactor and then transferred to the second reactor, where 46 wt % of a low molecular weight ethylene polymer was made. The catalyst employed was a Ziegler-Natta catalyst comprising, by weight: Ti:17; Cl:41; Al:2; Mg:5.

Isobutane, ethylene, 1-hexene, triethylaluminium and the above catalyst were continuously introduced into the first loop reactor and the polymerisation of ethylene was carried out in this mixture in order to form the copolymer (A). This mixture, including copolymer (A), was continuously withdrawn from the first reactor and introduced into a second loop reactor of the same volume as the first, operating at a temperature of 90° C. and a pressure of 2.1 MPa g, at the same time as hydrogen and additional ethylene and isobutane, and the polymerisation of the ethylene carried out therein in order to form polymer (B). Polymer (B) was a low molecular weight fraction containing some 1-hexene carried over from the first reactor.

In all three Examples the ratio of ethylene concentration in the second reactor to that in the first reactor was less than 5 and remained constant, and consequently the ratio of the average activity in the second reactor to the average activity in the first reactor was between 0.25 and 1.5, where average activity in each reactor is defined as the amount of polyethylene produced in the reactor (kgPE)/[ethylene concentration in the reactor (mol %)×residence time in the reactor (hours)× weight of catalyst in the reactor (g)]. The amount of catalyst in each reactor was the same and could therefore be ignored. Thus in Example 1 for instance, activity in reactor 1 could be considered as 166/(2.42×1.57)=43.7, and the activity in reactor 2 could be considered as 145/(5.4×1.02)=26.4, giving a ratio of activity in the second reactor to the activity in the first reactor of 26.4/43.7=0.6.

Table 1 below contains the polymerisation parameters which were the same in all three Examples.

TABLE 1

| REACTOR 1 | | |
|---|---|---|
| Temperature | ° C. | 79 |
| Hydrogen/ethylene ratio | mol/mol | 0.015 |
| 1-hexene/ethylene ratio | mol/mol | 1.41 |
| Residence time | H | 1.57 |
| HLMI | g/10 min | 1.12 |
| Density | kg/m³ | 925.9 |
| REACTOR 2 | | |
| Temperature | ° C. | 90 |
| Hydrogen/ethylene ratio | mol/mol | 0.18 |
| 1-hexene/ethylene ratio | mol/mol | 0.55 |
| Residence time | H | 1.02 |
| MI$_5$ | g/10 min | 0.71 |
| MI$_2$ | g/10 min | 0.22 |
| Density | kg/m³ | 946.5 |
| Calculated properties | | |
| LMW - density | kg/m³ | 972 |
| LMW - MI$_2$ | g/10 min | 150 |
| HMW - C6 incorp | g/kg | 160 |
| HMW fraction | wt % | 53.4 |
| LMW fraction | wt % | 46.6 |
| Productivity | kgPE/gcata | 37.5 |
| Average activity ratio R2/R1 | | 0.60 |

LMW = low molecular weight
HMW = high molecular weight
Melt flow indices MI$_2$ and MI$_5$ denote the melt flow indices measured according to ISO Standard 1133 at a temperature of 190° C. under loads of 2.16 kg and 5 kg respectively. Melt flow index HLMI is understood to denote the melt flow index measured according to ISO Standard 1133 at a temperature of 190° C. under a load of 21.6 kg.

Example 1

Table 2 contains the polymerisation conditions specific to Example 1.

TABLE 2

| REACTOR 1 | | |
|---|---|---|
| Ethylene concentration | mol % | 2.42 |
| Production rate | kg/h | 166 |
| Solid concentration | wt % | 24 |

TABLE 2-continued

| REACTOR 2 | | |
|---|---|---|
| Ethylene concentration | % mol | 5.4 |
| Production rate | kg/h | 145 |
| Total production rate | kg/h | 311 |
| Solid concentration | wt % | 28 |

The suspension containing the ethylene polymer was continuously withdrawn from the second reactor and transferred to a flash tank operating at a pressure of 0.8 MPa g and a temperature of 70, as a result of which 100 mol % of the liquid present were flashed off. These were then recondensed at a temperature of 25° C. and 0.8 MPa g without any recompression. The solids recovered from the flash vessel were passed to a secondary flash vessel to remove potential residual volatiles and then recovered.

The polymerisation conditions are shown in Table 2 above. The hydrogen/ethylene molar ratio of 0.18 was selected to target the desired product and an ethylene molar concentration in the second reactor of 5.4 mol % was chosen to satisfy the present invention. This gives a hydrogen content of 1.0 mol %. This composition was unchanged when it entered the flash tank.

The invention requires the equation $C_{lights}<7+0.07(40-T_c)+4.4(P_c-0.8)-7(C_{H2}/C_{Et})$ to be satisfied. Here, $C_{lights}$ was 6.4 mol %, $T_c$ was 25° C. and $P_c$ was 0.8 MPa g, meaning that the equation becomes $C_{lights}<7+0.07(40-25)+4.4(0.8-0.8)-7(1/5.4)$ which is $C_{lights}<7+1.05-1.30=6.75$ mol %. Accordingly it can be seen that the equation is satisfied. In this case 98.2 mol % of the material flashed off from this composition in the flash tank was recondensed, without the need for recompression or substantial cooling. Thus only 1.8 mol % of the material flashed off from this composition needed to be recompressed. The low proportion of material requiring recompression provides two main benefits. First, the size of the equipment required for performing the recompression and recycling step, including compressor, pumps, and separation devices such as distillation columns and membranes, can be reduced. Second, the energy consumption for this stage of the process can also be significantly reduced. The reduction in the size of the compressor is particularly beneficial, as it is a very expensive piece of equipment and uses a large amount of energy.

Example 2

This polymerisation was carried out under the same conditions as Example 1, as summarised in Tables 1 and 2.

The suspension containing the ethylene polymer was continuously withdrawn from the second reactor and transferred to a flash tank operating at a pressure of 1.2 MPa g and a temperature of 78.5° C., as a result of which about 80 mol % of the liquid present were flashed off. These were then recondensed at a temperature of 25° C. and 1.2 MPa g without any recompression. The solids recovered from the flash vessel were passed to a secondary flash vessel to remove potential residual volatiles and then recovered.

The invention requires the equation $C_{lights}<7+0.07(40-T_c)+4.4(P_c-0.8)-7(C_{H2}/C_{Et})$ to be satisfied. Here, $C_{lights}$ was 6.4 mol %, $T_c$ was 25° C. and $P_c$ was 1.2 MPa g, meaning that the equation becomes $C_{lights}<7+0.07(40-25)+4.4(1.2-0.8)-7(1/5.4)$ which is $C_{lights}<7+1.05+1.76-1.30=8.51$ mol %. Accordingly it can be seen that the equation is satisfied. In this case 98.7 mol % of the material flashed off from this composition in the flash tank was recondensed without the need for recompression or substantial cooling. Thus only 1.3 mol % of the material flashed off from this composition needed to be recompressed.

Example 3

In Example 3, the ethylene molar concentration was increased in both reactors compared with Examples 1 and 2 without changing the catalyst flowrate, hydrogen to ethylene ratio or residence time (as shown in Table 1). Therefore the production rate in both reactors was higher and the weight % of solids was higher too, as shown in Table 3 below.

TABLE 3

| REACTOR 1 | | |
|---|---|---|
| Ethylene concentration | % mol | 3.76 |
| Production rate | kg/h | 258 |
| Solid concentration | wt % | 37 |
| REACTOR 2 | | |
| Ethylene concentration | % mol | 8.4 |
| Production rate | kg/h | 226 |
| Total production rate | kg/h | 484 |
| Solid concentration | wt % | 43 |

The downstream treatment process was the same as for Example 1. In this case also, 100 mol % of the liquid was flashed in the flash tank. As a result, in order to satisfy the present invention the molar concentration of $C_{lights}$ components also needed to be the same (6.75 mol %). However the effective value $C_{lights}$ in this case was 8.4+0.18*8.4=9.91 mol %. Therefore this Example is clearly outside the scope of the present invention.

As a result, only 95 mol % of the material flashed off from this composition in the flash tank was condensed without the need for recompression and/or substantial cooling. Accordingly, 5 mol % of the material flashed off from this composition needed to be recompressed—almost three times that in Example 1. The benefit of the present invention can be seen clearly from comparing Examples 1 and 3. The need to recompress or substantially cool 5 mol % rather than 1.8 mol % of the stream will require equipment capable of handling almost three times the volume of material, with a similarly large increase in energy consumption.

The Invention claimed is:

1. Process for producing a multimodal polyethylene in at least two reactors connected in series, in which 20-80 wt % of a first polymer is made in suspension in a first reactor and 80-20 wt % of a second polymer is made in suspension in a second reactor in the presence of the first polymer, and a stream or slurry containing the resulting polymer is withdrawn from the second reactor and transferred to a flash tank operating at a pressure and temperature such that at least 50mol % of the liquid component of the slurry, or the non-polymer component of the stream entering the flash tank, is withdrawn from the flash tank as a vapour, wherein the concentration in the stream or slurry entering the flash tank of components having a molecular weight below 50 g/mol, $C_{lights}$ (mol %), satisfies the equation $C_{lights} < 7 + 0.07(40 - T_c) + 4.4(P_c - 0.8) - 7(C_{H2}/C_{Et})$ where $T_c$ and $P_c$ are respectively the temperature (in ° C.) and pressure (MPa g) at the location where the vapour withdrawn from the flash tank is condensed, and $C_{H2}$ and $C_{Et}$ are the molar concentrations in the flash tank of hydrogen and ethylene respectively.

2. Process according to claim 1, wherein a stream is withdrawn from the second reactor and transferred to a flash tank operating at a pressure and temperature such that at least 50mol % of the non-polymer component of the stream entering the flash tank is withdrawn from the flash tank as a vapour, wherein the concentration in the stream entering the flash tank of components having a molecular weight below 50 g/mol, $C_{lights}$ (mol %), satisfies the equation $C_{lights} < 7 + 0.07(40 - T_c) + 4.4(P_c - 0.8) - 7(C_{H2}/C_{Et})$ where $T_c$ and $P_c$ are respectively the temperature (in ° C.) and pressure (MPa g) at the location where the vapour withdrawn from the flash tank is condensed, and $C_{H2}$ and $C_{Et}$ are the molar concentrations in the flash tank of hydrogen and ethylene respectively.

3. Process according to claim 1, wherein a slurry is withdrawn from the second reactor and transferred to a flash tank operating at a pressure and temperature such that at least 50mol % of the liquid component of the slurry is withdrawn from the flash tank as a vapour, wherein the concentration in the slurry entering the flash tank of components having a molecular weight below 50, $C_{lights}$ (mol %), satisfies the equation $C_{lights} < 7 + 0.07(40 - T_c) + 4.4(P_c - 0.8) - 7(C_{H2}/C_{Et})$ where $T_c$ is the condensation temperature (° C.) of said vapour, $P_c$ is the pressure (MPa g) at the location where the vapour withdrawn from the flash tank is condensed, and $C_{H2}$ and $C_{Et}$ are the molar concentrations in the flash tank of hydrogen and ethylene respectively.

4. Process according to claim 1, wherein the concentration in the second reactor of components having a molecular weight below 50also satisfies the equation $C_{lights} < 7 + 0.07(40 - T_c) + 4.4(P_c - 0.8) - 7(C_{H2}C_{Et})$, where $C_{lights}$, $C_{H2}$, and $C_{Et}$ in this case are the concentrations of components having a molecular weight below 50, hydrogen and ethylene respectively in the second reactor, and $T_c$ and $P_c$, are as defined in claim 1.

5. Process according to claim , wherein the concentration in the stream or slurry entering the flash tank of hydrogen, ethylene and components having a molecular weight below 50 is the same as the concentration of hydrogen, ethylene and components having a molecular weight below 50 in the second reactor.

6. Process according to claim 1, wherein a high molecular weight (HMW) polymer is made in suspension in the first reactor and a low molecular weight (LMW) polymer is made in suspension in the second reactor in the presence of the first polymer.

7. Process according to claim 6, wherein the ratio of the average activity in the second LMW reactor to the average activity in the first HMW reactor is from 0.25 and 1.5, where average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)], residence time being defined as [mass of the polymer in the reactor (kg)/the output rate of polymer from the reactor (kg/hr)].

8. Process according to claim 6, wherein the ratio of ethylene concentration (in mol %) in the second reactor to that in the first reactor is 5 or less.

9. Process according to claim 5, wherein the concentration of ethylene in the second reactor is less than 8mol %.

10. Process according to claim 1, wherein a low molecular weight (LMW) polymer is made in suspension the first reactor and a high molecular weight (HMW) polymer is made in suspension in the second reactor in the presence of the first polymer.

11. Process according to claim 10, wherein the ratio of the average activity in the second HMW reactor to the average activity in the first LMW reactor is from 1.5 and 0.25, where average activity in each reactor is defined as the rate of polyethylene produced in the reactor (kgPE/hr)/[ethylene concentration in the reactor (mol %)×residence time in the reactor (hours)×feed rate of catalyst into the reactor (g/hr)], residence time being defined as [mass of the polymer in the reactor (kg)/the output rate of polymer from the reactor (kg/hr)].

12. Process according to claim 10, wherein the ratio of ethylene concentration (in mol %) in the second reactor to that in the first reactor is 5 or less.

13. Process according to claims 10, wherein the concentration of ethylene in the second reactor is less than 8 mol %.

14. Process according claim 1, wherein the concentration of components having a molecular weight below 50 in the slurry entering the flash tank is controlled by a post-polymerisation treatment, in which the conditions between the second reactor and the flash tank are controlled to ensure that further polymerisation takes place before entering the flash tank, thereby consuming some of the components having a molecular weight below 50.

15. Process according to claim 1, wherein the concentration of components having a molecular weight below 50 in the slurry entering the flash tank is controlled either by introducing additional liquid into the slurry as it passes through the transfer line between the second reactor and the flash tank, and/or by adjusting the solids concentration of the slurry as it passes through said transfer line.

16. Process according to claim 1, wherein the vapour withdrawn from the flash tank is cooled to a temperature between 15 and 50° C., after which at least 98mol % is recycled to a polymerisation reactor.

17. Process according to claim 1, wherein the reactors are loop reactors.

18. Process according to claim 8, wherein the ratio of ethylene concentration (in mol %) in the second reactor to that in the first reactor is 3 or less.

19. Process according to claim 8, wherein the ratio of ethylene concentration (in mol %) in the second reactor to that in the first reactor is 2.5 or less.

20. Process according to claim 9, wherein the concentration of ethylene in the second reactor is between 1.5mol % and 8mol %.

21. Process according to claim 12, wherein the ratio of ethylene concentration (in mol %) in the second reactor to that in the first reactor is 3 or less.

22. Process according to claim 12, wherein the ratio of ethylene concentration (in mol %) in the second reactor to that in the first reactor is 2 or less.

23. Process according to claims 13, wherein the concentration of ethylene in the second reactor is between 2mol % and 8mol %.

24. Process according to claim 16, wherein the vapour withdrawn from the flash tank is cooled to a temperature between 15 and 40° C.

25. Process according to claim 17, wherein the reactors are liquid full loop reactors.

* * * * *